(12) United States Patent
Broberg et al.

(10) Patent No.: US 8,323,447 B2
(45) Date of Patent: *Dec. 4, 2012

(54) PROCESS FOR THE MANUFACTURING OF A THERMOSETTING LAMINATE

(75) Inventors: Martin Broberg, Trelleborg (SE); Jorgen Nissen, Trelleborg (SE); Bengt Ruuth, Lund (SE); Johan Iveberg, Malmo (SE); Hakan Zander, Trelleborg (SE); Ake Sjoberg, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 1016 days.

This patent is subject to a terminal disclaimer.

(21) Appl. No.: 10/722,575

(22) Filed: Nov. 28, 2003

(65) Prior Publication Data

US 2004/0134587 A1    Jul. 15, 2004

(30) Foreign Application Priority Data

Dec. 2, 2002 (SE) ........................ 0203596

(51) Int. Cl.
*B32B 37/00*     (2006.01)
*B29C 65/00*     (2006.01)

(52) U.S. Cl. .................. 156/307.7; 156/268; 156/307.4; 156/309.6

(58) Field of Classification Search ............... 156/307.4, 156/307.7, 268, 307.1, 309.6
See application file for complete search history.

(56) References Cited

U.S. PATENT DOCUMENTS

| | | | |
|---|---|---|---|
| 1,995,264 A * | 3/1935 | Mason ........................... 52/591.1 |
| 4,406,455 A * | 9/1983 | Berry et al. .................... 473/117 |
| 4,770,916 A * | 9/1988 | Leukel et al. ................... 428/95 |
| 4,826,912 A | 5/1989 | Ko et al. |
| 4,882,208 A * | 11/1989 | Breitscheidel et al. ......... 428/17 |
| 4,885,659 A * | 12/1989 | Nowell et al. .................. 361/212 |
| 4,944,998 A | 7/1990 | Ko et al. |
| 5,288,762 A | 2/1994 | Park et al. |
| 5,317,476 A | 5/1994 | Wallace et al. |
| 6,093,473 A * | 7/2000 | Min, III ........................ 428/147 |
| 6,485,823 B2 * | 11/2002 | Karam .......................... 428/323 |
| 6,761,961 B1 * | 7/2004 | Moebus ........................ 428/167 |
| 2001/0011114 A1 * | 8/2001 | Uebayashi et al. ........... 524/195 |
| 2002/0092252 A1 | 7/2002 | Kettler et al. |

FOREIGN PATENT DOCUMENTS

| | | |
|---|---|---|
| JP | 01-310058 | 12/1989 |
| JP | 01310058 A * | 12/1989 |
| JP | 02299842 A * | 12/1990 |

OTHER PUBLICATIONS

WO 02/47906 Jun. 2002 Sjoberg et al.*
WO 01/21366 Mar. 2001 Moebus.*
JPO abstract for JP 1-310058, Dec. 1989.*
Derwent abstract for JP 1-310058, Dec. 1989.*

* cited by examiner

*Primary Examiner* — John Goff
(74) *Attorney, Agent, or Firm* — Jenkins, Wilson, Taylor & Hunt, P.A.

(57) ABSTRACT

A process for the manufacturing of a decorative laminate, which laminate comprises an upper decorative and abrasion resistant thermosetting laminate layer and a carrying core. The upper side of the core is provided with the abrasion resistant thermosetting laminate while the lower side of the core is provided with a balance layer. This balance layer has the purpose of preventing warping of said decorative laminate while at the same time having the purpose of acoustic dampening. The balance layer comprises a layer of a polymer. The balance layer and the thermosetting laminate are joined with said core by means of pressing. Said carrying core further is provided with a dampening foil of an elastomer arranged between the upper side of the core and the abrasion resistant thermosetting laminate. The elastomer and thermosetting laminate are joined with each other and with the core by means of pressing. The achieved laminate is then cut into panels and provided with edges intended for joining.

29 Claims, No Drawings

PROCESS FOR THE MANUFACTURING OF A THERMOSETTING LAMINATE

The present invention relates to a process for the manufacturing of a decorative thermosetting laminate with a damping layer intended to decrease the sound-level.

Products coated with thermosetting laminate are common nowadays. They are foremost used where the demands on abrasion resistance are great, but also where resistance towards different chemicals and moisture are demanded. As example of such products can be mentioned floors, floor beadings, work tops, desk tops and wall panels.

The thermosetting laminate most often consists of a number of base sheets with decor sheet arranged closest to the surface. The decor sheet can be provided with a desired decor or pattern. Such laminates are very hard in order to withstand the wear they are exposed to. This will unfortunately lead to a high noise level when hard objects are retarded suddenly by the laminate surface, such as hard heels towards a laminate surface.

It is desirable to be able to muffle the sound level in locales with a floor surface of laminate, specially in locales where shoes normally are used.

It has, through the present invention, been made possible to meet the above mentioned desires and a thermosetting laminate with a lower noise level has been achieved. Accordingly, the invention relates to a process for the manufacturing of a decorative laminate. The laminate comprises an upper decorative and abrasion resistant thermosetting laminate layer and a carrying core. The invention is characterised in that the upper side of the core is provided with the abrasion resistant thermosetting laminate and that the lower side of the core is provided with a balance layer. The balance layer have the purpose of preventing warping of said decorative laminate and is at the same time having the purpose of acoustic dampening. The balance layer comprises a layer of a polymer, whereby said balance layer and said thermosetting laminate are joined with said core by means of pressing. Said carrying core further is provided with a dampening foil of an elastomer arranged between the upper side of the core and the abrasion resistant thermosetting laminate which elastomer and which thermosetting laminate are joined with each other and with the core by means of pressing. The achieved laminate is then cut into panels and provided with edges intended for joining.

The thermosetting laminate is preferably constituted by one or more decor papers impregnated with melamine-formaldehyde resin and one or more overlay sheets impregnated with melamine formaldehyde resin arranged on top of the decor papers. The thermosetting laminate may further possibly constitute one or more conventional resin impregnated underlay papers, arranged under the decor paper or decor papers, which underlay papers preferably contains phenol-formaldehyde resin. The different papers are laminated together under increased pressure and increased temperature. At least one of the sheets impregnated with thermosetting resin, preferably the outermost, is provided with hard particles of for example silicon oxide, aluminium oxide and/or silicon carbide with an average size of 1-100 μm, preferably around 5-60 μm. The thermosetting laminate suitably has a thickness in the range 0.1 mm-1.2 mm, preferably 0.3 mm-0.9 mm and a density in the range 1250-1500 kg/m$^3$.

The carrying core is suitably constituted of a particle board, a fibre board or an oriented strand board. It is also possible to use a board based on polymers such as polyurethane or a fibre cement board. A polymer based board may further comprise fibre and particles.

The balance layer is suitably constituted of a thermoplastic elastomer. The balance layer suitably has elasticity compression coefficient in the range 0.5-2.7 Mpa, preferably 0.8-2.0 Mpa as measured according to ISO 3386-1 with supplement from ISO 7214. The balance layer preferably has a thickness in the range 0.1-5 mm, preferably 0.2-1 mm. The balance layer is suitably constituted of an expanded physically cross-linked polyolefin with closed cells and suitably has a density in the range 50-400 kg/m$^3$, preferably 80-330 kg/m$^3$.

Thus, the layers and/or sheets may be joined by heat and a water-soluble standard glue, i.e., a material other than a melt glue; heat and a melt glue; heat and pressure and a melt glue; glue and pressure; and heat, glue and pressure.

The balance layer may also be constituted by massive rubber with a thickness in the range 0.1-5 mm.

According to another embodiment of the invention the balance sheet is constituted by a non-woven fibre arranged on a polyolefin foil. The non-woven fibre is suitably constituted by polypropylene, polyester, viscose or the like while the polyolefin foil suitably is constituted of polyethylene. The balance layer suitably has an unloaded average thickness in the range 0.3-5 mm and an unloaded density in the range 150-800 kg/m$^3$.

According to one embodiment of the invention the balance sheet may be constituted of recycled and processed packaging material containing cellulose, polyethylene and possibly aluminum. The major portion of polyethelene is present in the form of low density polyethylene and only small amounts of high density polyethylene may be present. From this material a sheet or foil with a thickness of 0.5-5 mm is manufactured. The sheet or foil is constituted of 2-30% by weight of cellulose 0-20% of aluminum and the main remaining portion polyethylene. The sheet or foil may also be expanded by any known means to a density in the range 500-950 kg/m$^3$.

According to one embodiment of the invention the balance sheet further comprises a conductive material. The purpose of this conductive material is to reduce the risk for build-up of static charges. The conductive material may be constituted of carbon black, carbon fibre or even of particulate aluminum. It is also possible to use a conductive material which is constituted of a vacuum metallized layer. Such a metallized layer is then suitably constituted of aluminium. The conductivity is preferably better than 500 kΩcm.

The balance layer and the thermosetting laminate is suitably joined with the carrying core by means of a bonding agent and pressure. The bonding agent can hereby be constituted by a water-soluble standard glue or a so-called melt-glue. In the latter case the balance layer, the carrying core and the thermosetting laminate joined via heat and pressure. It is also possible to let the balance layer itself work as a melt-glue layer. The balance layer is then suitably non-expanded and will then have a density in the range 400-900 kg/m$^3$.

Thus, the layers and/or sheets may be joined by heat and a water-soluble standard glue, i.e., a material other than a melt glue; heat and a melt glue; heat and pressure and a melt glue; glue and pressure; and heat, glue and pressure.

An alternative to having conductive materials in the balance sheet it is also possible to use a glue which comprises a conductive material. This glue may then contain a conductive material which is constituted of carbon black or of carbon fibre. Also here the conductivity is suitably better than 500 kΩcm.

As discussed above the thermosetting laminate has a thickness in the range 0.1 mm-1.2 mm, preferably 0.3 mm-0.9 mm while the thermosetting laminate has a density in the range 1250-1500 kg/m$^3$. The dampening foil between this thermosetting laminate and the carrying core is suitably constituted of a thermoplastic elastomer. The dampening foil suitably has elasticity compression coefficient in the range 0.5-2.7 Mpa, preferably 0.8-2.0 Mpa, as measured according to ISO 3386-1 with supplement from ISO 7214, and a thickness in the range 0.1-0.7 mm, preferably 0.1-0.5 mm. The dampening foil is preferably constituted of an expanded physically cross-linked polyolefin with closed cells and has a density in the range 150-400 kg/m$^3$, most preferably 180-330 kg/m$^3$. Also the dampening foil may contain a conductive material which is constituted of carbon black or of carbon fibre. Also here the conductivity is suitably better than 500 kΩcm.

The dampening foil and the thermosetting laminate is suitably joined with the carrying core by means of glue and pressure.

According to one embodiment of the invention also the dampening foil comprises a conductive material. The purpose of this conductive material is to further reduce the risk for build-up of static charges. The conductive material may be constituted of carbon black or of carbon fibre. It is also possible to use a conductive material which is constituted of a vacuum metallized layer. Such a metallized layer is then suitably constituted of aluminium. The conductivity is preferably better than 500 kΩcm.

The invention claimed is:

1. A process for the manufacturing of a decorative laminate, which laminate comprises an uppermost and lower visible surface, the uppermost surface comprising a decorative and abrasion resistant thermosetting laminate layer; a dampening foil between the decorative and abrasion resistant thermosetting laminate layer; the dampening foil having a thickness in the range of 0.1-0.7 mm consisting of expanded, physically cross-linked polyolefin with closed cells and a density in the range 150-400kg/m$^2$, and containing a non-metallic conductive material providing better than 500Ωcm; said non-metallic conductive material being at least one selected from the group consisting of carbon black and carbon fiber; and a carrying core; wherein an upper side of the core faces the abrasion resistant thermosetting laminate and that a lower side of the core faces the lower visible surface; wherein the lower visible surface consists of a balance layer, said balance layer having the purpose of preventing warping of said decorative laminate and at the same time having the purpose of acoustic dampening, said balance layer consisting of an expanded polymer and 2-30% cellulose; said polymer comprising a polyethylene; said balance layer having an unloaded density in the range of 500-950 kg/m$^3$ and an unloaded thickness in the range of 0.5-5 mm; the balance layer, the dampening foil and said thermosetting laminate are joined with said fiber board core by pressing the thermosetting laminate layer, the dampening foil, the core and the balance layer with a bonding agent under heat and pressure to form the decorative laminate, and the achieved decorative laminate is thereafter cut into panels and provided with edges intended for joining.

2. A process according to claim 1, wherein the thermosetting laminate is constituted by one or more decor papers impregnated with melamine-formaldehyde resin and one or more overlay sheets impregnated with melamine formaldehyde resin arranged on top of the decor papers and optionally one or more resin impregnated underlay papers, arranged under the decor paper or decor papers, which papers are laminated together under increased pressure and increased temperature.

3. A process according to claim 2, wherein at least one of the sheets impregnated with thermosetting resin is provided with hard particles with an average size of 1-100 μm.

4. A process according to claim 2, wherein the thermosetting laminate has a thickness in the range 0.3 mm-1.2 mm.

5. A process according to claim 2, wherein the thermosetting laminate has a density in the range 1250-1500 kg/m$^3$.

6. A process according to claim 1, wherein the balance layer has an elasticity compression coefficient in the range 0.5-2.7 MPa.

7. A process according to claim 1, wherein the bonding agent is a melt-glue.

8. A process according to claim 1, wherein the bonding agent is glue which comprises a conductive material.

9. A process according to claim 8, wherein the conductive material is constituted of carbon black.

10. A process according to claim 8, wherein the conductive material is constituted of carbon fibre.

11. A process according to claim 1, wherein, the thermosetting laminate has a thickness in the range 0.3 mm-1.2 mm.

12. A process according to claim 11, wherein the thermosetting laminate has a density in the range 1250-1500 kg/m$^3$.

13. A process according to claim 1, wherein the dampening foil has an elasticity compression coefficient in the range 0.5-2.7 MPa.

14. A process according to claim 1, wherein the dampening foil and the thermosetting laminate are joined with the carrying core by melt-glue.

15. A process according to claim 3, wherein the hard particles have an average size of 5-60 μm.

16. A process according to claim 2, wherein the thermosetting laminate has a thickness in the range 0.3 mm-0.9 mm.

17. A process according to claim 1, wherein the thermosetting laminate has a thickness in the range 0.3 mm-0.9 mm.

18. A process according to claim 1, wherein the dampening foil has an elasticity compression coefficient in the range 0.8-2.0 MPa.

19. A process according to claim 1, wherein the dampening foil has a thickness in the range 0.1-0.5 mm.

20. A process according to claim 1, wherein the dampening foil has a density in the range 180-330 kg/m$^3$.

21. A process according to claim 3, wherein the hard particles are at least one selected from the group consisting of silicon oxide, aluminum oxide and silicon carbide.

22. The process of claim 1, wherein the expanded polymer of the balance layer comprises low density polyethylene and high density polyethylene.

23. The process of claim 22, wherein, the low density polyethylene is in greater proportion in the expanded polymer as compared to the proportion of the high density polyethylene present in the expanded polymer.

24. A process according to claim 1, wherein the carrying core is constituted by a particle board.

25. A process according to claim 1, wherein the carrying core is constituted by a fiber board.

26. A process according to claim 1, wherein the carrying core is constituted by an oriented strand board.

27. A process according to claim 1, wherein the carrying core is constituted by a board based on polymers.

28. A process according to claim 1, wherein the carrying core is constituted by a fiber cement board.

29. A process according to claim 28, wherein the board further comprise particles.

* * * * *